April 5, 1960 S. W. E. ANDERSSON 2,931,619
ELECTROMAGNETIC VALVES
Filed Dec. 6, 1955 2 Sheets-Sheet 2
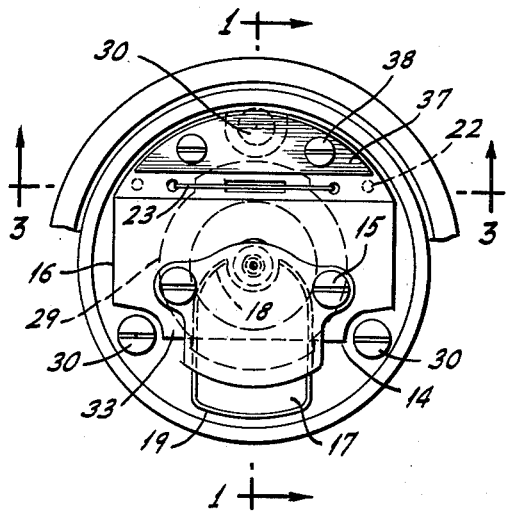
FIG. 2.
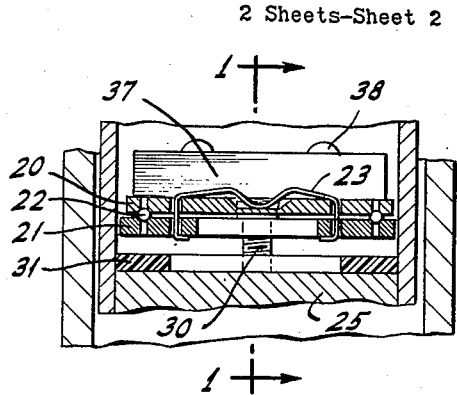
FIG. 3.
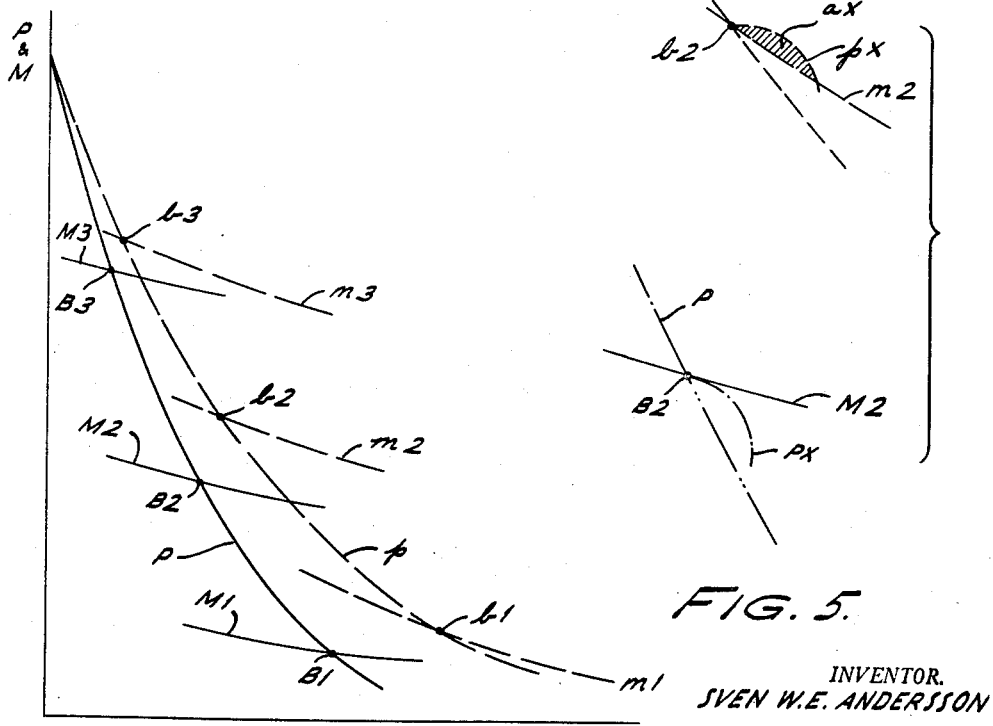
FIG. 4.
FIG. 5.
INVENTOR.
SVEN W.E. ANDERSSON
BY Carl H. Lynnestvedt
AGENT United States Patent Office 2,931,619
Patented Apr. 5, 1960

2,931,619

ELECTROMAGNETIC VALVES

Sven W. E. Andersson, Philadelphia, Pa., assignor to Philco Corporation, Philadelphia, Pa., a corporation of Pennsylvania Application December 6, 1955, Serial No. 551,276

6 Claims. (Cl. 251—139)

This invention relates to electromagnetic valves, particularly direct-acting electromagnetic regulating valves for the control of gases and other fluids. The apparatus of the invention increases stability as well as sensitivity in such valves.

Stability is a feature of fundamental importance for valves, by virtue of which a valve will assume and maintain a certain position anywhere within its range when called for by an impulse or input signal—in accordance herewith, an electrical signal—without performing any vibrations and excursions not present in said input signal. More specifically, static stability exists if a displacement of the valve from said certain or equilibrium position sets up a force, after the transient condition causing the displacement has expired, tending to drive the valve back to the equilibrium position. A statically stable valve may, however, be dynamically unstable. Dynamic instability in a valve manifests itself by vibrations about an equilibrium position; this undesirable phenomenon is variously described as buzzing, chattering or continuous hunting of the valve. The alternating force that sustains such vibrations may be looked upon as a negative damping force or feed-back, furnished by the fluid flow through the valve itself; in this sense the vibrations of a dynamically unstable valve may be called "self-excited." It is one of the main objects of the invention to provide a high degree of static and dynamic stability in an electromagnetic valve; a condition which was lacking in prior electromagnetic valves.

Particularly, it is an object of the invention to provide stability in an electromagnetic "regulating" valve, that is, a valve wherein an electromagnetic force is employed for moving a valve part so as to throttle a passage and thereby to limit or "regulate" the flow characteristics of a fluid —frequently a gas—passing through the passage.

It is also important for many valves and mainly for regulating valves that there be provided a high degree of sensitivity, in the sense that the valve should respond to electrical impulses of the lowest possible power level. The impulses to be responded to may be furnished, for instance, by automatic measurements derived from the flow passing through the valve itself, or they may be furnished by independent signals from any other source. It is usually desirable to provide a valve, particularly a regulating valve, with a high degree of sensitivity. Furthermore, it is common and well known to use an electromagnetic force for the operation of a mechanism in order to obtain sensitivity. Nevertheless, it has been impossible to increase sensitivity beyond certain limits in electromagnetic valves. One of the important objects of this invention is to overcome this limitation of prior electromagnetic valves.

Heretofore it was particularly difficult to achieve high sensitivity and high stability in combination with one another, in a direct-acting electromagnetic valve. For this reason it was usual in regulating valves to sacrifice sensitivity to a large extent in order to insure full stability. In view of the well known advantages of electromagnetic control, such as the possibility of instantaneous and remote action, this was a serious and regrettable limitation. These limitations of prior regulating valves, as well as those of prior electromagnetic valves, have now been relieved; they are practically eliminated by the present invention. Thus the invention contributes to the art: a valve, particularly a regulating valve, endowed with the combined advantages of electromagnetic actuation, high sensitivity and high stability.

Desirably, the new valve also has other important features such as responsiveness (which calls for promptness and accuracy of response while the aforementioned sensitivity calls for a low power demand of response). It is a further object to provide a valve of the type referred to which is highly responsive, also suitably compact, economical and generally efficient.

In the description of a specific example, which follows, a direct-acting unbalanced valve designed according to the invention regulates a gas-driven servomechanism for the steering of a rocket type missile. In such an application of the device it is often necessary to provide an extremely high degree of sensitivity. For instance it is often important to provide a mechanical response to extremely feeble electric currents released by radio signals. Often it is also important to provide an extremely high degree of stability. For instance, it is usually necessary to insure that the valve should seek certain predetermined equilibrium positions, without valve vibration, in spite of strong vibrations and rapid accelerations of the entire missile during powered flight.

While an application in the field of rocket flight control will be described particularly, the valve has many other uses. It can be applied with advantage to the solution of control problems in a broad sense.

Additional features, advantages and applications of the invention will become apparent to those skilled in the art upon a study of the following description of a preferred embodiment.

The electromagnetic valve according to the invention is characterized, and enabled to achieve the stated objects, by certain basic aspects of its design. Briefly, it is one such basic aspect of the present valve design that the valve utilizes what may be called a combination of force-compensating features. The fluid pressure force inherently present in the valve is compensated, desirably, by certain deflector means; and the magnetic force for operating the valve is also compensated in certain manners. Another important aspect of the present valve is that it comprises a certain combination of movable valve disc and deflector structures, which combination receives, handles and discharges the flow in such manner as to partly balance, at a certain predetermined force rate, the fluid pressure forces tending to open the valve disc. Still another important aspect of the present valve is that it comprises magnetic core and armature members forming an air gap system of such form as to provide a certain predetermined force rate for the electromagnetic forces induced between said core and armature in the various positions of the valve; the armature being used to move the valve. Desirably an annular armature having a conical inside surface surrounds a central core or tip of a core, having a similar conical outside surface; said core also forming part of the valve means discharging the flow which is then received and handled by a valve disc and deflector structure.

The details will be understood more clearly when now turning to an actual embodiment, which is illustrated in the appended drawings. Herein—

Fig. 2 is a sectional plan view of the same apparatus, the section being taken along the line 2—2 of Fig. 1.

Fig. 3 is a fragmentary sectional view wherein the section is taken along the line 3—3 in Fig. 2.

Fig. 4 is a graph schematically illustrating operating forces of significance for the performance of the valve, and Fig. 5 is an enlarged detail from Fig. 4.

Figure 1:
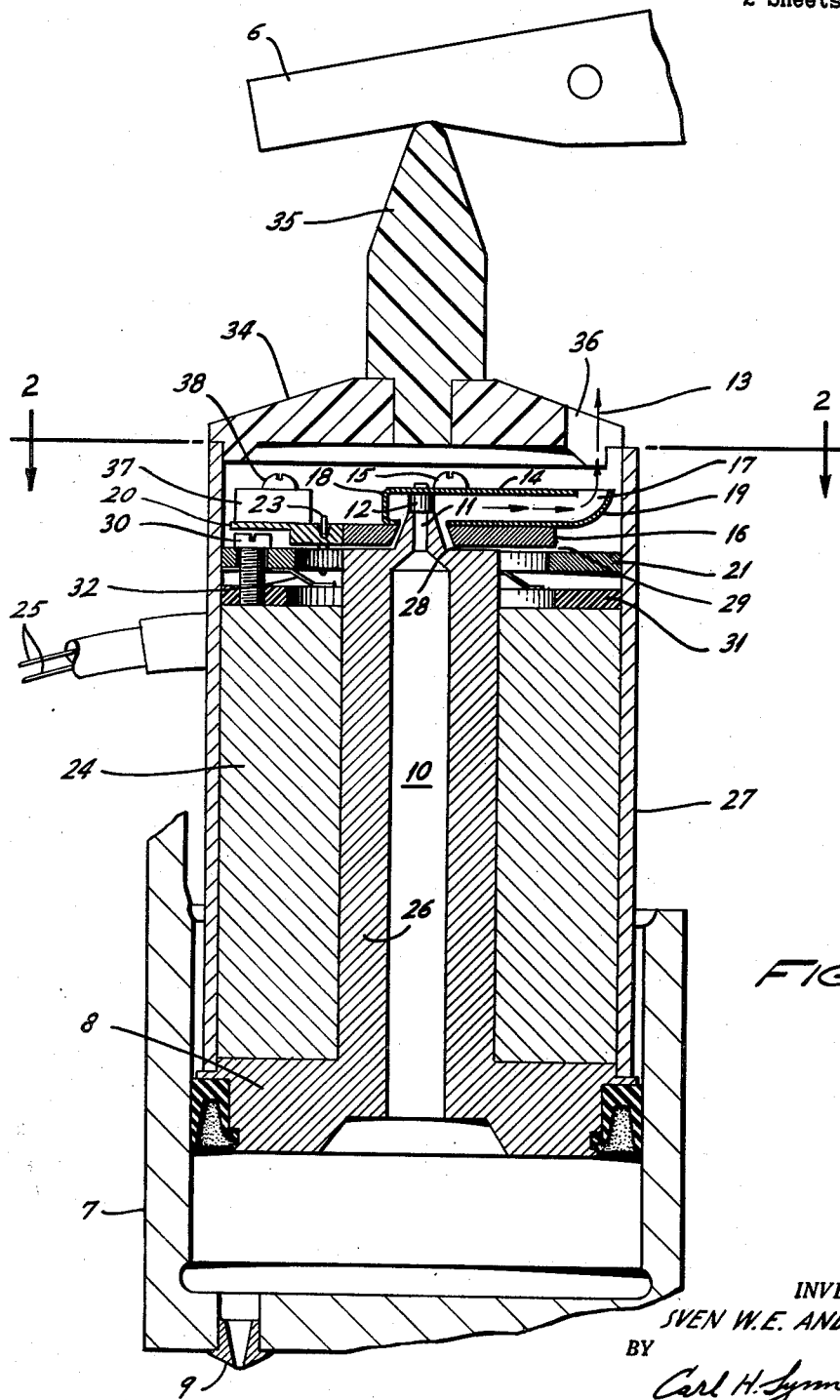
Fig. 1 is a sectional elevation of an electromagnetic valve according to this invention, the section being taken along the line 1—1 of Fig. 2.

In the upper part of Fig. 1 a part of a torque lever 6 of a servomechanism is shown. Another part of this lever (not shown) may actuate a rudder, aileron or steering fin in a rapidly moving vessel or missile or the like. The illustrated servomechanism comprises a cylinder 7 containing a single-acting piston 8. Operating fluid, for instance a suitable gas, enters the cylinder through an inlet 9 and leaves it through the new electromagnetic valve. The valve here acts as a bleeder for controlling the fluid pressure applied to the piston. The valve is shown as bodily movable with and substantially incorporated in the piston 8. For this purpose, the piston has a central passage 10 which leads away from the cylinder or inlet side of the device. The passage ends in a small outlet orifice 11. The uppermost or terminal part of the orifice structure is formed, as by grinding or polishing, to provide a flat, narrow, annular valve seat directly surrounding the orifice.

Opposite the valve seat there is a valve disc 12, desirably having a flat circular surface on its underside. The valve disc is held at a variable distance from the valve seat; and in the present embodiment, as will be described hereinafter, the valve disc is allowed to tilt slightly, for instance one angular degree, while it moves from its wide open position to the position wherein it contacts the valve seat, and reverse. Fluid escapes laterally between the valve seat and the valve disc when the valve is opened; and the tilting of the valve disc, however small it may be, causes a small unilateral bias—the fluid tends to flow out of the valve mainly in that region where the angular movement makes the valve opening relatively wide. In the present Fig. 1, said region is located at the right. The slight, unilateral bias is strongly promoted and supplemented by providing a special passage for an out-flow 13 directed toward the right side. This directed flow 13 serves to provide the above-mentioned partial balance of valve-opening fluid pressure forces.

Further provision is made for applying a magnetic force to valve disc 12, tending to close the valve. For this purpose the disc is fastened by a flat, preferably non-magnetic support plate 14 and by screws 15, to a magnetic armature and valve actuator plate 16. This armature is annular, having an approximately central, frusto-conical, upwardly tapering aperture therein, whereby the armature can freely move along the nozzle structure 11, the preferred outer shape of that structure being similar to the inner surface of the annular armature. The outer contour of the armature can be more or less rectangular, as will be described hereinafter.

Interposed between the armature plate 16 and its mounting plate 14, there is provided a duct or trough structure 17, best shown in Figs. 1 and 2 together. The duct or trough has a circular inlet opening in the underside of one end thereof, approximately coinciding with the aperture of the annular armature and surrounding the central orifice structure 11 at a small distance therefrom. In the upper side of the duct, at the other end thereof, there is an outlet opening for the flow 13.

The duct 17, as illustrated, can be constructed so that it receives practically all of the fluid issuing from the orifice 11, an upward suction being set up in the space between the orifice structure and the frusto-conical armature surface as soon as the valve is opened to a significant extent. The duct 17 then guides the fluid toward the outlet opening at right between fluid-confining side walls 18. Adjacent the outlet of the duct the side walls 18 form a deflector section 19 which preferably is inclined. It is particularly shown as inclined with smooth or rounded transition from the lower duct wall to the side wall. This deflector and outlet structure 19 is provided in order that part of the static and dynamic fluid pressures, acting in an upward direction, may be compensated by certain downward forces of dynamic impact pressure and fluid flow reaction.

The magnetic armature plate 16, as shown, is rigidly joined to a small extension stub 20 opposite the duct 17. This extension stub is desirably non-magnetic and is hinged to a support 21 which desirably may serve also as a leveling structure and as a pole shoe or pole ring. The hinging arrangement is best shown in Fig. 3. It is provided by a pair of bearing balls 22, each seated in a suitable recess of the valve plate extension 20 and a similar recess of the mounting ring 21. A spring clip 23 may hold the parts 20, 21, 22 together.

Returning to Fig. 1: Magnetic force for the operation of the valve is supplied by a coil 24. This coil is connected by a pair of conductors 25 to an electric control circuit, not otherwise shown. The coil surrounds a central, cylindrical, magnetically highly permeable, substantially magnetically non-retentive piston extension or core 26, which core, as suggested above, has the passage 10 extending therethrough, the end of the core being formed as a flat plane or shoulder with the orifice 11 coaxially extending therefrom.

On the other hand the coil 24 is surrounded by an outer, cylindrical, magnetically highly permeable and substantially non-retentive piston extension or shell 27. Thus there is formed a core and shell magnet 8, 26, 27, substantially self-shielding against external flux leakage. The leveling and pole ring 21 is fitted into an upper part of the shell 27, substantially at the elevation of the shoulder on the upper end of the core 26. There are formed, in effect, a pair of small internal air gaps: a central air gap 28 and an outer air gap 29. The central air gap is formed between the core 26 and the inner part of the annular armature plate 16; it has a compound annular form, with a flat disc shape below the armature plate and frusto-conical shape in the armature opening. The outer air gap 29, between the pole ring or plate 21 and the outer part of the armature plate 16 has flat shape throughout. The magnetic circuit of the present electromagnetic valve consists basically of the armature 16, inner or compound air gap 28, core 26, piston 8, shell 27, pole ring 21, and outer or flat air gap or system of air gaps 29.

The leveling and pole ring 21 (Figs. 1 and 2) has sliding fit in the shell 27. Its position relative to the other parts can be adjusted axially of the unit, for purposes of control over pneumatic as well as magnetic conditions in the unit. The adjustment is made by means of suitable set screws 30 which extend through drilled holes in the ring 21 and are threaded into a non-magnetic mounting ring 31 press-fitted into shell 27. The heads of these screws press downwards on the leveling ring 21, against a mechanical upward pressure, which may be derived for instance from a spring washer 32 interposed between rings 21, 31. As clearly shown in Fig. 2, two of the set screws 30 have their centers on a line parallel with the axis 3—3 of the valve hinge 22, 22. This arrangement is used in order to facilitate a positional adjustment of the valve hinge axis so that the underside of the valve disc 12 may have accurate, flat, parallel contact with the valve seat when the valve is in closed position. However, the leveling ring 21 can be tilted somewhat, without changing the above position of the hinge axis or valve alignment; for instance by uniformly tightening the two screws 30, which are on a line parallel with the hinge axis and suitably loosening the third set screw 30. Such re-adjustment varies the air gap or gaps 29 between the armature plate 16 and leveling ring 21 where these members overlap. At the same time the pressure retained in the cylinder 7, with a given intake pressure at 9, can be adjusted to a predetermined value for any given control current in coil 24, by a proper adjustment of screws 30.

The shell 27 is shown in Fig. 1 as extending above and beyond the inwardly projecting rings 21, 31. Thus it provides a mounting base for a non-magnetic cover 34 which protects the valve mechanism and supports a central push rod 35 whereby the piston 8 engages the lever 6. A suitably shaped and dimensioned aperture 36 is provided in the cover 34 for venting off the gas discharged by the valve 11, 12 and trough 17. Also suitable upper valve stop means, not shown, can be incorporated in the cover.

The arrangement of the magnetic shell 27 and pole ring 21, relative to the core 26, can be conventional. In particular, provision can be made by various well-known design features to minimize flux leakage losses; that is, in effect to concentrate the entire magnetic flux successively into the areas of the air gaps 28, 29. On the other hand, a feature identifiable as a magnetic flux shunt is deliberately provided by extending the orifice nozzle structure 11, forming part of the magnetic core, through the central aperture in the armature plate 16 and upwardly a small distance beyond that plate, and by the conical configuration of the orifice structure and armature opening. The distance by which the nozzle projects above the armature is desirably short and approximates only the maximum stroke length of the armature or a very few integral multiples thereof. Thus at least a small part of the magnetic flux in the compound-shaped air gap 28 is shunted into an air gap portion so shaped as to provide a decreasing magnetic force rate with increasing valve openings: the magnetic flux in the frusto-conical part of the inner air gap decreases less rapidly than the flux in the flat part of air gap 28, when the air gap is increased. The magnetic pull on the armature therefore decreases less abruptly with increasing air gaps or valve openings. This feature of a tapered air gap or tapered section of an air gap can be utilized to various extents, depending on specific applications of the electromagnetic valve.

The feature that the nozzle 11 projects through the armature plate 16, into the duct 17, provides also a peculiar pneumatic arrangement; that is, an arrangement such that the gas issuing from the orifice 11 enters directly into a deflector or combined deflector and flow reactor structure. Thus the magnetic forces applied to the valve need not buck or overcome any significant upward pressures acting on any extended surfaces around the valve. In fact, downward reaction and dynamic pressures are thus applied, in the area of the deflector and outlet wall 19, counteracting and partly offsetting the centrally applied upward fluid pressures on valve disc 12. The exact dimensioning of the duct, like that of the armature, depends on the valve application; and it is usually desirable to correlate these several dimensions in certain manners. Details of such correlation will be explained presently.

In the operation of the present valve, as indicated above, it is contemplated that rapid and even violent accelerations, decelerations and similar dynamic disturbances may take place. It will be assumed that the piston 8 is balanced against such influences, for instance by the lever 6 or parts connected therewith, not shown. However, the disturbances must be prevented also from mechanically interfering with the operation of the sensitive valve flapper 12, 16, 17, 20. Therefore a counterweight 37 is provided on one side of the hinge 22, 22 to mechanically balance the mass of the valve flapper; that mass being constituted by the valve disc 12, armature plate 16, pressure balance duct 17 and cooperating elements 14, 18, etc., located on the other side of the hinge. The counterweight is desirably formed as a non-magnetic block, secured to the plate extension 20 by suitable screws 38. In the interest of rapid response, the combined masses of the active valve elements and of the counterweight are kept as low as possible.

In this latter connection it is desirable also to keep the size and mass of the duct 17 as small as possible. However, in the interest of sensitivity an appreciable pressure balancing force must be derived from the duct. For these reasons it is preferred to construct the duct 17 so that fluid pressure balance forces can be derived therein, from the small fluid pressure sources still available past orifice 11, with the greatest possible efficiency. Desirably said balance forces are derived in part from a fluid discharge reaction pressure and in other part from a fluid velocity or impact pressure; and both of these forces are obtained from the flow 13 in the duct 17. This will explain the use of the inclined and preferably rounded outlet and deflector wall 19 for the duct 17. The design of the duct is such as to minimize losses of available compensating pressure, which losses might be occasioned by unnecessary eddy action in the duct. The duct is preferably made relatively long so that the compensating force obtained at the end of the duct is applied to the valve structure a considerable distance from the hinge axis in order to provide a substantial moment, about said hinge, for this force.

Reference is now made to Fig. 4 which illustrates the relationship between fluid forces and magnetic forces acting upon the present valve and comparable valves of the prior art when different heights H of valve opening are established. In the interest of simpler explanation all forces are assumed to be transposed or applied in one point such as the center of the valve disc. A curve P represents resultant valve opening forces, in relation to different extents of opening H of the present valve when a certain inlet pressure is maintained at the inlet 9. Other curves of similar shape would have to be drawn for other pressures at said inlet, but one curve will suffice for our basic explanation. The solid-line curve P illustrates the pressure conditions for a valve according to the invention; a dotted curve p is drawn for a corresponding conventional valve which has no means for compensating the forces produced by the fluid. A comparison of the two curves shows that the valve opening forces are substantially greater for the conventional valve at all valve openings except the closed position where the forces are equal.

A family of magnetic force curves M1, M2, M3 is shown. Each of these curves corresponds to a certain current in the coil 24 and an infinite number of such curves could, of course, be drawn. These curves, drawn in solid lines, represent the valve closing magnetic forces acting in the air gap system of the present valve. Another set of magnetic curves $m1$, $m2$, $m3$ is indicated by dotted lines for a conventional valve. The latter curves are somewhat steeper due to the absence of the special or compound form of the air gap. The curves $m1$, $m2$, $m3$ are shown slightly above the corresponding curves M1, M2, M3 in order to avoid superimposition of such curves; they still show, accurately, the different slants of the two families of curves. The crossing points of mutually applicable curves, such as B1, B2, B3 and $b1$, $b2$, $b3$, represent equilibrium or balance points for the valve because the respective fluid and magnetic forces act in opposite directions, i.e., the former is an opening force and the latter a closing force.

These curves represent steady state conditions; they are useful for analyzing the static stability in the various balance points. Consider, for example, point B2, which is a crossing of curves P and M2, applying to a valve in accordance with the invention. A small excursion of the valve from this point to either the right or left on the diagram, that is, to a larger or smaller valve opening, will produce a considerable difference or unbalance between the pressure and magnetic forces because the curves cross at a large angle. This considerable unbalance tends to move the valve back to the balanced position B2, since curve M2 is much less steep than curve P. The static stability in point B2 is therefore very adequate. This is also the case in points B1 and B3.

If the same analysis is applied to balance points $b1$, $b2$ and $b3$, illustrating the conditions in a conventional valve, it will be seen that static stability still exists, mainly in points b3, b2, but that it is less definite and becomes marginal at large valve openings, as exemplified by point b1 where the curves cross at a very small angle.

Thus it can be said that the static stability of a valve is improved substantially by the combined compensating means of the present invention, which in effect flatten the magnetic force curves and steepen the fluid pressure curves.

A statically stable valve may yet be dynamically unstable, as pointed out in the introduction. Static stability is only a prerequisite. Each curve P and p, etc., represents only a series of steady state conditions, wherein the valve, at a given pressure upstream of inlet 9 and at a given volume of cylinder 7, discharges the fluid flow 13 at a mass rate equal to the mass rate of fluid influx at inlet 9, thereby maintaining a series of different but steady pressures in cylinder 7. Actually, it is necessary to consider a different type of valve-opening force curves whenever transient conditions prevail in the valve; more specifically, force curves expressing the manner in which the valve opening force changes when the valve is shifted accidentally and rapidly a small amount from any of the balance points.

For this purpose, Fig. 5 shows enlarged views of the area near crossing points B2 and b2. Assume a conventional valve to be moving rapidly towards a larger valve opening or to the right from point b2 during an accidental disturbance. While this happens the valve opening force cannot be expected to decrease simultaneously along curve p, for the following reasons. The valve opening force is, in this case, at every instant determined by the static and velocity fluid pressures on the valve. The force on the valve due to static pressure, which is proportional to the cylinder pressure, falls relatively slowly because the cylinder volume causes a time lag: the valve cannot instantaneously discharge the extra fluid which must be removed from the cylinder in order to lower the cylinder pressure to a value corresponding to the increased and increasing valve opening. The rate of discharge is consequently greater, during this transient period, than in a steady state condition. In addition, the valve opening force due to velocity pressure also is abnormally great during the transient condition because this force is proportional to the mass flow rate times the velocity in orifice 11, both of which depend on the cylinder pressure and fall with the same, that is, less rapidly than the valve position changes. For these reasons a valve opening force curve pX, representing the combined valve opening forces during a transient period, starts in a very flat direction, here to the right from point b2; it then exhibits a gradual decline, as shown.

The next question is whether the curve pX gradually merges again with the steady state curve p, as a rapidly dampened vibration curve, or whether it continues to disturb the conditon repersented by curve p. In conventional valves, the latter is likely to happen for the reason which follows.

Adjacent to the point b2, the curve pX may often lie above the pertinent magnetic force curve m2. Thus the two curves enclose an area aX. In this area the pneumatic valve-opening forces are greater than the magnetic valve-closing forces, so that the force differential caused by the pneumatic time lag actually tends to boost the speed of the accidental valve movement toward larger valve opening. The situation is similar as to an accidental movement toward smaller valve opening.

As a result the fluid may in this manner contribute energy to a vibration and sustain it indefinitely as a self-excited vibration. Dynamic valve stability is destroyed by this condition.

Such was the condition and problem of prior attempts to regulate fluid flow charcteristics by electro-magnetic valves. The only known counter-measure was to increase the lengths of the air gaps to make the magnetic curves m1, m2, etc. approach horizontal directions. The sensitivity was, however, very adversely affected; the longer air gaps substantially increased the number of ampere turns or power consumed for producing the required magnetic pull.

The lower view in Fig. 5 shows the conditions in the vicinity of a balance point B2, under the same circumstances, for a valve in accordance with the invention. The magnetic curve M2 is here flatter and the opening force curve P is steeper, for reasons explained in connection with Fig. 4. In addition, the transient opening force curve PX here starts in with a greater downward component, because the valve opening forces provided by the static and velocity fluid pressures are in this case supplemented by the compensating force or forces obtained from the flow 13 in duct 17. These compensating forces are opposed to the fluid forces tending to open the valve; and they are approximately proportional to the product of mass flow rate and velocity in duct 17. Since the compensating forces act on the valve structure in a region further away from the hinge than the valve disc, their effect in term of forces acting on the valve disc is quite considerable. The result is that in this case the transient opening force curve PX at no point lies above the magnetic closing force curve M2 but instead slopes downwardly well below this curve. Therefore the closing forces exceed the opening forces during a transient condition, as well as in a steady state condition. This force differential retards the speed of any accidental excursion; it tends to maintain the valve in the equilibrium position B2.

An analysis for an excursion to the left yields the same result.

The change in the compensating forces during a change in the position of the valve according to this invention increases with increasing speed of the change of valve position. This is a characteristic of a damping force. Thus the present compensating arrangement produces not only a modification of the working force rates, enhancing static stability, but also an effective positive damping force establishing dynamic stability; all this without any increase of air gap length and decrease of sensitivity.

While only a single embodiment of the invention has been described, it should be understood that the details thereof are not to be construed as limitative of the invention, except insofar as set forth in the following claims.

I claim:

1. In an electromagnetic valve for regulating a flow of fluid, a movable structure; stationary means associated with said structure to form a variable valve passage which can be restricted and opened by a movement of said structure, said stationary means being adapted when said passage is open to discharge a stream of fluid, forming part of said flow, toward the movable structure and thereby to apply a force to the movable structure, tending to open the valve passage more widely; a magnetic armature surrounding a portion of the stationary means and movable with said movable structure; a stationary electromagnet associated with said stationary means for applying electromagnetic forces to the armature so as to move the armature and thereby said movable structure against said stream and thus to restrict the valve passage; and means in said movable structure adapted to derive from said stream a force tending to restrict the valve passage and partly to balance the first-mentioned force.

2. In an electromagnetic valve as described in claim 1, an inside surface on the magnetic armature and an adjacent outside surface on said stationary means, both surfaces tapering in the direction of the stream discharged by said stationary means.

3. In an electromagnetic regulator, a movable valve member; stationary valve means forming with said movable member a variable valve passage, to be restricted and opened by movement of said movable member, said stationary valve means having an opening for discharging a stream of fluid toward said movable member and for thus applying a force thereto, tending to open the valve passage; a magnetic armature rigid with said movable member and movable through a variable air gap of minute maximum length compared with the width of said opening; an electromagnet associated with the stationary valve means for applying electromagnetic forces to the armature so as to move the armature and thereby said movable member against said stream, tending to restrict the valve passage; and means in said movable member adapted to derive from said stream a force tending to restrict the valve passage and partly to balance the force applied to said movable member by the discharge of the stream.

4. An electromagnetic valve as described in claim 3 wherein the electromagnet comprises an inner cylindrical core, an outer cylindrical shell and a pole ring, extending inwardly from the shell, and wherein the armature overlies portions of the core and of the pole ring.

5. An electromagnetic valve as described in claim 4 wherein the pole ring is slidably adjustable along the shell.

6. An electromagnetic valve as described in claim 4 wherein the armature is pivoted to the pole ring.

References Cited in the file of this patent
UNITED STATES PATENTS

| | | |
|---|---|---|
| 1,933,852 | Hahn | Nov. 7, 1933 |
| 2,589,574 | Ray | Mar. 18, 1952 |
| 2,686,535 | Tourneau | Aug. 17, 1954 |
| 2,747,612 | Lee | May 29, 1956 |